United States Patent
Negi et al.

(10) Patent No.: US 9,028,711 B2
(45) Date of Patent: May 12, 2015

(54) NEGATIVE ELECTRODE MATERIAL FOR A NONAQUEOUS ELECTROLYTE SECONDARY BATTERY AND A METHOD FOR ITS MANUFACTURE

(75) Inventors: Noriyuki Negi, Amagasaki (JP); Tatsuo Nagata, Ikeda (JP); Sukeyoshi Yamamoto, Nishinomiya (JP)

(73) Assignees: Nippon Steel & Sumitomo Metal Corporation, Tokyo (JP); Chuo Denki Kogyo Co., Ltd., Myoko-Shi (JP)

( * ) Notice: Subject to any disclaimer, the term of this patent is extended or adjusted under 35 U.S.C. 154(b) by 282 days.

(21) Appl. No.: 13/642,284

(22) PCT Filed: Apr. 25, 2011

(86) PCT No.: PCT/JP2011/060039
§ 371 (c)(1),
(2), (4) Date: Jan. 4, 2013

(87) PCT Pub. No.: WO2011/132793
PCT Pub. Date: Oct. 27, 2011

(65) Prior Publication Data
US 2013/0207049 A1      Aug. 15, 2013

(30) Foreign Application Priority Data

Apr. 23, 2010 (JP) ................. 2010-099982

(51) Int. Cl.
*H01M 4/88* (2006.01)
*H01M 4/36* (2006.01)
(Continued)

(52) U.S. Cl.
CPC .............. *H01M 4/364* (2013.01); *H01M 4/134* (2013.01); *H01M 4/1395* (2013.01); *H01M 4/38* (2013.01);
(Continued)

(58) Field of Classification Search
USPC .................. 252/182.1, 503; 429/218.1, 231.9
See application file for complete search history.

(56) References Cited

U.S. PATENT DOCUMENTS 6,593,030 B2   7/2003   Bito et al.
7,235,329 B2   6/2007   Ishikawa et al.

FOREIGN PATENT DOCUMENTS

CN   101339990 A   1/2009
CN   101577332 A   11/2009
(Continued)

OTHER PUBLICATIONS

Alcantara et al., "Recent advances in nanocrystalline intermetallic tin compounds for the negative electrode of lithium ion batteries", Energy Harvesting and Storage: Materials, Devices, and Applications II, Proc. of SPIE, 2011, pp. 803506-1 to 803506-8, vol. 8035.

(Continued)

*Primary Examiner* — Khanh Tuan Nguyen
(74) *Attorney, Agent, or Firm* — The Webb Law Firm (57) ABSTRACT

An inexpensive negative electrode material for a nonaqueous electrolyte secondary battery includes three types of powder materials: alloy material A; alloy material B; and a conductive material. Alloy material A includes a $CoSn_2$ structure containing Co, Sn, and Fe and has an Sn content of at least 70.1 mass % and less than 82.0 mass %. Alloy material B includes $Co_3Sn_2$ and has a lower discharge capacity than alloy material A. The proportion $R_B$ of the mass of alloy material B based on the total mass of alloy material A and B is greater than 5.9% and less than 27.1%. The content of the conductive material is at least 7 mass % and at most 20 mass % based on the total mass of alloy material A and B, and the conductive material. The exotherm starting temperature for the negative electrode material is less than 375.4° C.

6 Claims, 6 Drawing Sheets

(51) Int. Cl.
*H01M 4/134* (2010.01)
*H01M 4/1395* (2010.01)
*H01M 4/38* (2006.01)
*H01M 4/62* (2006.01)
*C22C 1/00* (2006.01)
*C22C 13/00* (2006.01)
*H01M 10/0525* (2010.01)

(52) U.S. Cl.
CPC .............. *H01M 4/622* (2013.01); *H01M 4/625* (2013.01); *H01M 10/0525* (2013.01); *Y02E 60/122* (2013.01); *C22C 1/00* (2013.01); *C22C 13/00* (2013.01)

(56) References Cited

FOREIGN PATENT DOCUMENTS

| | | |
|---|---|---|
| EP | 1033767 A1 | 9/2000 |
| EP | 1039568 A1 | 9/2000 |
| JP | 2001250541 A | 9/2001 |
| JP | 2002251992 A | 9/2002 |
| JP | 20046206 A | 1/2004 |
| JP | 2004183019 A | 7/2004 |
| JP | 2006100244 A | 4/2006 |
| JP | 2006236835 A | 9/2006 |
| JP | 2007335418 A | 12/2007 |
| JP | 4100175 B2 | 3/2008 |
| JP | 200866025 A | 3/2008 |
| JP | 2008179846 A | 8/2008 |
| JP | 200948824 A | 3/2009 |

OTHER PUBLICATIONS

Ferguson et al., "Study of Sn30(Co1-xFex)30C40 Alloy Negative Electrode Materials Prepared by Mechanical Attriting", Journal of the Electromechanical Society, 2009, pp. A13-A17, vol. 156, No. 1.

Zheng Liang et al., "Synthesis and Electrochemical Properties of SnCo1-xFex/C Composite", J. Mater. Sci. Technol., 2010, pp. 653-659, vol. 26, No. 7.

Zhang et al.; "CoSn Alloys as Negative Electrode Materials for Lithium-ion Batteries"; Chem. J. of Chinese Universities; 2006; pp. 1923-1926; vol. 27; No. 10. English-Language Abstract Attached.

NEGATIVE ELECTRODE MATERIAL FOR A NONAQUEOUS ELECTROLYTE SECONDARY BATTERY AND A METHOD FOR ITS MANUFACTURE

TECHNICAL FIELD

This invention relates to a negative electrode material for a nonaqueous electrolyte secondary battery and a method for its manufacture, and particularly to a negative electrode material for a lithium ion secondary battery and a method for its manufacture.

BACKGROUND ART

Attempts are being made to apply a Co—Sn compound as a negative electrode material to lithium ion secondary batteries because Co—Sn compounds are expected to provide a higher capacity than graphite materials. Specific examples of a Co—Sn compound which are being applied are CoSn, $CoSn_2$, and the like. In a lithium ion secondary battery using a Co—Sn compound as a negative electrode material, it is concerned that the cycle properties of the lithium ion secondary battery are degraded due to repeated expansion and contraction of the Co—Sn compound caused by charge and discharge.

Patent Document 1 discloses $Co_3Sn_2$ as an example of an alloy which exhibits a higher capacity than graphite materials and which at the same time has good cycle properties without causing excessive expansion and contraction. Patent Document 2 discloses $Co_3Sn_2$ as an example of an intermetallic compound which can be used in a negative electrode material. Patent Document 3 describes $CoSn_2$ as an intermetallic compound which is used in negative electrode materials and discloses that $Co_3Sn_2$, which is formed as a by-product, is eliminated by heat treatment. Patent Document 4 describes $CoSn_2$ as a Co—Sn compound for use in a negative electrode material, and it discloses that $Co_3Sn_2$, which is formed as a by-product other than the desired compound, is eliminated by heat treatment. Patent Document 5 discloses a Co—Sn—Fe compound as a negative electrode material and mentions using inexpensive Fe, which is an element cheaper than Co but having the same battery capacity as Co, as a means of decreasing the amount of expensive Co.

PRIOR ART DOCUMENTS

Patent Documents

Patent Document 1: JP 2001-250541 A
Patent Document 2: JP 4 100 175 B
Patent Document 3: JP 2006-100244 A
Patent Document 4: JP 2008-179846 A
Patent Document 5: JP 2009-48824 A

SUMMARY OF THE INVENTION

Each of Patent Documents 1-4 mentions using $Co_3Sn_2$ as a negative electrode material. Among these, Patent Document 1 states that $Co_3Sn_2$ has a higher capacity than graphite materials and has good cycle properties. Although $Co_3Sn_2$ has a higher capacity than graphite materials, when compared in a crystalline state, among Co—Sn compounds, $Co_3Sn_2$ has a lower capacity than to CoSn or $CoSn_2$. It is desired that a negative electrode material have both a high capacity and improved cycle properties.

The raw material price of Co wildly fluctuates due to political instability and the like in producing regions. From the standpoint of stable production, it is undesirable for products to have a high Co content. Patent Document 5 mentions that the use of expensive Co can be decreased by using inexpensive Fe as an element having a lower price but the same battery capacity as Co. It is not mentioned therein about the cycle properties when using Fe, and there is room for further study.

An object of the present invention is to provide a negative electrode material for a nonaqueous electrolyte secondary battery which maintains the high capacity of a nonaqueous electrolyte secondary battery typified by a lithium ion secondary battery and which has improved cycle properties and a method for its manufacture. Another object of the present invention is to provide an inexpensive negative electrode material for a nonaqueous electrolyte secondary battery which suppresses the amount of expensive Co which is used and a method for its manufacture.

In order to achieve the above objects, the present inventors made the following findings as a result of experiments.

(1) When using a mixture which comprises alloy material A which comprises an alloy containing Co, Sn, and Fe and having a $CoSn_2$ structure (Fe replaces a portion of Co), alloy material B which comprises $Co_3Sn_2$ and has a lower discharge capacity than alloy material A, and a conductive material (typically a conductive carbonaceous material such as graphite) in a certain proportion, it is possible to increase the capacity of a negative electrode material for a nonaqueous electrolyte secondary battery comprising this mixture by increasing the nanocrystallinity of alloy material A and alloy material B. A nonaqueous electrolyte secondary battery comprising this negative electrode material suppresses a decrease in cycle properties (below, this property will be referred to as the negative electrode material having improved cycle properties), and this negative electrode material is inexpensive because it suppresses the amount of Co which is used compared to a negative electrode material of the prior art.

(2) The degree of nanocrystallinity of these alloy materials can be evaluated by the exotherm starting temperature of a negative electrode material which is determined by differential scanning calorimetry (DSC), and nanocrystallization of the above-described alloys can be carried out so that the exotherm starting temperature of the negative electrode material is less than 375.4° C. Below, unless otherwise specified, the exotherm starting temperature means the exotherm starting temperature (the temperature at which exotherm begins) of a negative electrode material determined by differential scanning calorimetry.

(3) Mechanical processing such as mechanical grinding treatment is suitable as a means of promoting nanocrystallization of the above-described alloys. In the present invention, mechanical grinding will be referred to as MG, mechanical grinding treatment will be referred to as MG treatment, and the duration for which mechanical grinding treatment is carried out will be referred to as the MG time.

By increasing the nanocrystallinity of the above-described alloy materials, the capacity of both alloy material A and alloy material B is increased, whereby it is possible to achieve both an increase in the capacity of a negative electrode material as a whole and an improvement in cycle properties.

According to one embodiment, the present invention, which was completed based on the above-described findings, is a negative electrode material for a nonaqueous electrolyte secondary battery characterized by including at least the following three types of powder materials, which are alloy material A, alloy material B, and a conductive material. Alloy material A comprises an alloy containing Co, Sn, and Fe and having a $CoSn_2$ structure, and it has an Sn content of at least 70.1 mass % and less than 82.0 mass % based on alloy material A. Alloy material B comprises $Co_3Sn_2$ and has a lower capacity than alloy material A. The proportion $R_B$ of the mass of alloy material B with respect to the total mass of alloy material A and alloy material B is greater than 5.9% and less than 27.1%. The content of the conductive material is at least 7 mass % and at most 20 mass % with respect to the total of alloy material A, alloy material B, and the conductive material. The exotherm starting temperature of the negative electrode material determined by differential scanning calorimetry is less than 375.4° C.

The alloy which alloy material A comprises and which has a $CoSn_2$ structure has a portion of Co replaced by Fe, so its composition is expressed as $Co_{1-x}Fe_xSn_y$ (where $0<x<0.5$ and $1.1 \leq y<2.3$).

In the present invention, capacity means discharge capacity (unit: mA/g). The details of the method for measuring discharge capacity will be described later.

The conductive material may contain graphite.

In another embodiment, the present invention provides a method of manufacturing a negative electrode material for a nonaqueous electrolyte secondary battery which includes the following steps:

a first alloy material forming step including the formation of alloy material A which comprises an alloy containing Co, Sn, and Fe and having a $CoSn_2$ structure and an Sn content of at least 70.1 mass % and less than 82.0 mass %;

a second alloy material forming step including the formation of alloy material B which comprises $Co_3Sn_2$ and has a lower capacity than alloy material A; and a mixing step including mixing of alloy material A, alloy material B, and a conductive material in such a manner that the proportion $R_B$ of the mass of alloy material B based on the total mass of alloy material A and alloy material B is greater than 5.9% and less than 27.1% and that the content of the conductive material based on the total amount of alloy material A, alloy material B, and the conductive material is at least 7 mass % and at most 20 mass %, thereby obtaining a negative electrode material having an exotherm starting temperature determined by differential scanning calorimetry of less than 375.4° C.

Preferably, the above-described method includes first MG treatment in which alloy material A is subjected to mechanical grinding (MG for short) and second MG treatment in which alloy material B is subjected to mechanical grinding.

More preferably, the mixing step includes third MG treatment in which a mixture containing at least alloy material A and alloy material B is subjected to mechanical grinding, wherein the third MG treatment functions as the first MG treatment and the second MG treatment.

Alternatively, the conductive material contains graphite, and the mixing step preferably includes fourth MG treatment in which a mixture comprising at least alloy material A, alloy material B, and the conductive material is subjected to mechanical grinding, wherein the fourth MG treatment functions as the first MG treatment and the second MG treatment.

A negative electrode material for a nonaqueous electrolyte secondary battery according to the present invention includes alloy material A and alloy material B which have been suitably nanocrystallized and therefore has a high capacity and improved cycle properties. In addition, a portion of Co in the alloy having a $CoSn_2$ structure which is included in alloy material A is replaced by Fe. Therefore, the amount of expensive Co which is used is suppressed compared to a negative electrode material in the prior art. As a result, a negative electrode material according to the present invention has excellent cost competitiveness.

MODES FOR CARRYING OUT THE INVENTION

Below, embodiments of the present invention will be explained in detail by referring to the drawings. In the following explanation, shapes, dimensions, temperatures, numeric values, and the like are examples for the purpose of explanation and can be appropriately varied.

1. Composition of Negative Electrode Material

In the present invention, a negative electrode material for a nonaqueous electrolyte secondary battery is formed from a mixture obtained by adding a conductive material to a metallic material having a metallic substance as a raw material, and at least the metallic material is in an advanced nanocrystallized state. The negative electrode material can be used as is as a negative electrode material for a nonaqueous electrolyte secondary battery, such as a lithium ion secondary battery to give a specific example. There is no limitation on a method of manufacturing the metallic material. One example of a method for its manufacture is a method comprising melting, casting, pulverizing and size-regulating, and, if necessary, blending. Another example is a method of mechanically manufacturing an alloy from alloy raw materials (a specific example being mechanical alloying).

A negative electrode material for a nonaqueous electrolyte secondary battery according to the present invention comprises at least three types of powder materials. These three types of powder materials are alloy material A, alloy material B, and a conductive material. There is no particular limitation on the shape of the powder materials. Taking into consideration ease of use as a negative electrode material, the average particle diameter of each of these materials is preferably at least 0.1 μm and at most 100 μm. These powder materials will be explained below. As described later, alloy material A and alloy material B are in a state in which nanocrystallization is made progress, and these materials may have undergone mechanical treatment such as MG treatment in order to allow nanocrystallization to progress. In such case, the alloy materials which underwent mechanical treatment have a decreased particle diameter. Since extremely fine powder tends to agglomerate, the average particle diameter is typically in the range from around 1 μm to around 20 μm.

(1) Alloy Material A

Alloy material A according to the present invention comprises an alloy containing Co, Sn, and Fe and having a $CoSn_2$ structure (referred to below as alloy A). In this alloy A, Fe replaces a portion of the Co in the $CoSn_2$ structure. The ratio of Fe to Co (referred to below as the Fe/Co ratio) in alloy A is preferably at most 1. In other words, the composition of alloy A is expressed as $Co_{1-x}Fe_xSn_y$ (where $0<x<0.5$ and $1.1 \leq y < 2.3$). As described below, if the Fe/Co ratio in alloy A is too high, the cycle properties of a nonaqueous electrolyte secondary battery including a negative electrode material comprising alloy material A worsen.

The Sn content of alloy material A according to the present invention is at least 70.1 mass % and less than 82.0 mass %. Preferably it is at least 78.0 mass % and at most 80.1 mass %. When the Sn content is too low, the discharge capacity of alloy material A becomes too low, and it is not possible to obtain a negative electrode material of high capacity. When the Sn content is too high, the cycle properties of a nonaqueous electrolyte secondary battery including this negative electrode material worsen.

(2) Alloy Material B

Alloy material B according to the present invention comprises $Co_3Sn_2$ and has a lower capacity than alloy material A. The proportion $R_B$ of the mass of alloy material B based on the total mass of alloy material A and alloy material B is greater than 5.9% and less than 27.1%. $R_B$ is more preferably at least 7.1% and at most 23.5%.

Since alloy material B has a lower capacity than alloy material A, variations in the volume of the material due to occlusion and discharge of charged particles (lithium ions when a nonaqueous electrolyte secondary battery is a lithium ion secondary battery) resulting from charge and discharge are smaller than for alloy material A, which has a relatively higher capacity. The content of alloy material A in the negative electrode material is higher than for alloy material B. Therefore, a negative electrode material according to the present invention has a structure in which alloy material B, which has a relatively small variation in volume, is interspersed in alloy material A, which has a relatively large variation in volume. Due to such a structure, variations in stress inside alloy material A caused by variations in the volume of alloy material A are easily dispersed into alloy material B. Accordingly, with a negative electrode material according to the present invention, stress variations inside the negative electrode material, caused by charge and discharge are decreased, and as a result, the cycle properties of a nonaqueous electrolyte secondary battery having this negative electrode material do not readily decrease. Namely, the negative electrode material has improved cycle properties.

From the standpoint of improving the cycle properties of a negative electrode material, the crystals contained in alloy material A and alloy material B are preferably in an advanced nanocrystallized state. By increasing the degree of nanocrystallization of alloy material A, the ratio of the surface area with respect to the volume of crystals of alloy material A is increased. As a result, the amount of alloy material B which absorbs stress variations due to volumetric expansion when one crystal of alloy material A occludes charged particles such as lithium ions is relatively increased, and it becomes easier for alloy material B to absorb stress variations. By increasing the degree of nanocrystallization of alloy material B, its capacity increases. Namely, considering only alloy material B, it expands if it undergoes nanocrystallization. Therefore, the ratio of the coefficient of volumetric expansion caused by charging of alloy material B in which nanocrystallization has progressed to the coefficient of volumetric expansion caused by charging of alloy material A is close to 1 (in other words, it is difficult for local regions to develop in which the coefficients of volumetric expansion are different). As a result, a negative electrode material including alloy material A and alloy material B both in a state in which nanocrystallization has progressed is expected to not readily develop cracks at the time of volumetric expansion due to charging.

(3) Conductive Material

A negative electrode material for a nonaqueous electrolyte secondary battery according to the present invention contains a conductive material. In the present invention, a conductive material means a material having a high mobility not only of electrons but also of charged particles such as lithium ions which move inside the negative electrode material during charge and discharge. A typical electrical conductivity of a conductive material according to the present invention is from around $1 \times 10^3$ to around $1 \times 10^5$ Ω·cm as expressed by volume resistivity. There are no limitations on specific compositions of a conductive material having such properties. Specific examples of such conductive materials are carbonaceous materials such as graphite and hard carbon, and intermetallic compounds such as CoSn. The higher the electrical conductivity (mobility) of the conductive material, the lower the internal resistance of the negative electrode material. Therefore, the electrical conductivity of the conductive material is preferably as high as possible. From this standpoint, the conductive material is preferably made of graphite.

The content of the conductive material in the negative electrode material according to the present invention is at least 7 mass % and at most 20 mass % based on the total amount of alloy material A, alloy material B, and the conductive material. If the content of the conductive material is too high, the capacity of the negative electrode material as a whole decreases, while if the content of the conductive material is too low, it is difficult to obtain a negative electrode material having improved cycle properties.

(4) Other Components

A negative electrode material according to the present invention may contain materials other than alloy material A, alloy material B, and the conductive material, but they should be of a type and amount so as not to adversely affect the properties of the negative electrode material. Examples of other acceptable materials are carbonaceous material such as graphite and hard carbon.

2. Exotherm Starting Temperature

A negative electrode material for a nonaqueous electrolyte secondary battery according to the present invention has the property that the exotherm starting temperature determined by differential scanning calorimetry is lower than 375.4° C. More preferably, the exotherm starting temperature is at least 227.8° C. and at highest 331.4° C.

As nanocrystallization progresses, regions where crystallization is incomplete increase, and release of strains accumulated in crystals and recrystallization occur at a lower temperature. Since these changes in the crystal state are exothermic reactions, the lower the exotherm starting temperature, the more the completeness of crystals of the alloys contained in the negative electrode material being measured has decreased, namely, the more nanocrystallization has progressed in alloy material A and alloy material B contained in the negative electrode material being measured. Accordingly, the exotherm starting temperature is an index which indicates the degree of nanocrystallization of alloy material A and alloy material B. When the exotherm starting temperature of a negative electrode material according to the present invention is lower than 375.4° C., it is possible to achieve both a high capacity of the material and a suppressed deterioration of the cycle properties of a nonaqueous electrolyte secondary battery including this negative electrode material. From the standpoint of obtaining a particularly high capacity and improved cycle properties, the exotherm starting temperature is preferably at most 331.4° C. When the exotherm starting temperature is excessively low, a crystal structure for occluding charged particles such as lithium ions cannot be adequately maintained, and the capacity may show a tendency to decrease. Accordingly, the exotherm starting temperature is preferably at least 227.8° C.

3. Method of Manufacturing a Negative Electrode Material

There is no particular limitation on a method of manufacturing a negative electrode material according to the present invention as long as it is characterized by the above-described composition and the above-described exotherm starting temperature.

A preferred example of a manufacturing method for a negative electrode material according to the present invention is a method including the following steps:

a first alloy material forming step including the formation of alloy material A which comprises an alloy containing Co, Sn, and Fe and having a $CoSn_2$ structure and an Sn content of at least 70.1 mass % and less than 82.0 mass %;

a second alloy material forming step including the formation of alloy material B which comprises $Co_3Sn_2$ and has a lower capacity than alloy material A; and a mixing step including mixing of alloy material A, alloy material B, and a conductive material in such a manner that the proportion $R_B$ of the mass of alloy material B based on the total mass of alloy material A and alloy material B is greater than 5.9% and less than 27.1% and that the content of the conductive material based on the total amount of alloy material A, alloy material B, and the conductive material is at least 7 mass % and at most 20 mass %, thereby obtaining a negative electrode material having an exotherm starting temperature determined by differential scanning calorimetry of less than 375.4° C.

Preferably, the above-described method includes first MG treatment in which alloy material A is subjected to mechanical grinding and second MG treatment in which alloy material B is subjected to mechanical grinding.

More preferably, the mixing step includes third MG treatment in which a mixture containing at least alloy material A and alloy material B is subjected to mechanical grinding, wherein the third MG treatment functions as the first MG treatment and the second MG treatment.

Alternatively, the conductive material contains graphite, and the mixing step preferably includes fourth MG treatment in which a mixture comprising at least alloy material A, alloy material B, and the conductive material is subjected to mechanical grinding, wherein the fourth MG treatment functions as the first MG treatment and the second MG treatment.

(1) Alloy Materials

Alloy material A is prepared by melting of raw material metals, casting, and pulverizing and size-regulating. Casting is preferably carried out by rapid solidification. Since alloy material A contains Fe in addition to Co and Sn, it is possible to suppress the amount of expensive Co which is used without considerably decreasing the capacity of a battery.

Alloy material B is prepared by melting of raw material metals, casting, and pulverizing and size-regulating. Here also, casting is preferably carried out by rapid solidification. Alloy material B contains $Co_3Sn_2$. The content of $Co_3Sn_2$ in alloy material B is preferably high, and more preferably alloy material B consists essentially of $Co_3Sn_2$.

Alloy material A and alloy material B contain impurities which are unavoidably incorporated from the raw materials or during the manufacturing process.

Below, a manufacturing method comprising melting, casting by rapid solidification, and pulverizing, and size-regulating will be explained as an example of a method of manufacturing alloy material A. A method of manufacturing alloy material B is the same as for alloy material A.

Melting is carried out by heating alloy raw materials in granular form in a melting crucible in a nonoxidizing atmosphere to completely melt them.

A crucible which is heat resistant at the melting temperature of the alloy raw materials and which has an inner surface made of a material which does not react with the alloy raw materials can be used as the melting crucible. For example, it is preferable to use a crucible made of alumina in the manufacture of alloy material A.

High frequency induction heating can be used as a heating method for melting. It is also possible to use other suitable heating methods, such as Ar arc heating or electron beam heating. The nonoxidizing atmosphere is preferably a nitrogen, helium, or argon atmosphere or a vacuum. An argon atmosphere is more preferred for manufacturing alloy material A.

The strip casting method may be used for rapid solidification. The strip casting method is a method in which a melt is poured from a slit provided in the bottom surface of a tundish onto a rotating water-cooled roll, resulting in continuous rapid solidification of the melt. It is also possible to employ the melt spinning method, the double-roll rapid solidification method, the gas atomizing method, the water atomizing method, the rotating electrode method, or the like.

Pulverizing can be carried out using a ball mill, a universal mill provided with pins, or the like. When using a rapid solidification method employing a roll such as the strip casting method, the melt spinning method, or the double-roll rapid solidification method, the resulting alloy is in the form of thin strip, so it is pulverized. Pulverizing may be followed by size-regulating which is carried out by classifying with a sieve having suitable openings. When using the gas atomizing method, the water atomizing method, or the mechanical alloying method, an alloy in powder form is prepared by rapid solidification, so it is not necessary to perform subsequent pulverizing.

In this manner, alloy material A is obtained. Alloy material B is obtained in the same manner.

(2) Conductive Material

Any means can be used to prepare the conductive material. As a specific example, a raw material for the conductive material such as graphite in the form of clumps can be transformed into powder using a known pulverizing means such as a ball mill.

(3) Negative Electrode Material

Any mixing means can be used to mix alloy material A, alloy material B, and the conductive material which were obtained in the above manner. A known means such as a ball mill, a blender, or the like can be used. When a mixture obtained by using a mixing means satisfies the conditions for the exotherm starting temperature, the mixture can be used as is as a negative electrode material in the present invention.

When the above-described mixture does not satisfy the conditions for the exotherm starting temperature, some form of treatment is carried out on the powder or powders obtained before the preparation of the above-described mixture or on the mixture itself to promote nanocrystallization of alloy material A and/or alloy material B contained in the mixture until the exotherm starting temperature is less than 375.4° C. There are no limitations on specific means for this treatment, but mechanical treatment such as MG treatment is typical. In the following explanation, MG treatment will be explained as a specific example.

The treatment conditions for MG treatment are not limited. Any conditions can be used as long as the exotherm starting temperature of the negative electrode material can be made less than 375.4° C. When the MG treatment conditions are overly gentle, nanocrystallization is not sufficiently advanced, and it becomes difficult to obtain an exotherm starting temperature of less than 375.4° C., while if the MG treatment conditions are overly severe, the alloy material essentially becomes amorphous and the capacity of the negative electrode material decreases. Therefore, the MG treatment conditions are suitably set taking these factors into consideration.

MG treatment is preferably carried out on both alloy material A and alloy material B. Namely, a method of manufacturing a negative electrode material according to the present invention preferably includes MG treatment of alloy material A (first MG treatment) and MG treatment of alloy material B (second MG treatment). By carrying out MG treatment on both alloy materials, the capacity of both alloy materials is increased and the capacity of the negative electrode material is increased, as a result of which variations in the stress inside the negative electrode material caused by charge and discharge are reduced. From the standpoint of simplifying the process, it is preferable to include third MG treatment in which a mixture of alloy material A and alloy material B is subjected to mechanical grinding treatment, with the third MG treatment functioning as the first MG treatment and the second MG treatment. MG treatment is more preferably carried out on a mixture of alloy material A, alloy material B, and the conductive material. The reason is unclear, but a negative electrode material having particularly excellent properties is obtained if MG treatment is carried out on a mixture containing a conductive material comprising graphite. Namely, it is particularly preferable to carry out fourth MG treatment in which mechanical grinding treatment is carried out on a mixture of at least alloy material A, alloy material B, and the conductive material, with the fourth MG treatment functioning as the first MG treatment and the second MG treatment.

EXAMPLES

Below, a negative electrode material according to the present invention will be explained in greater detail while referring to experimental results.

Alloy material A according to the present invention is based on a material (alloy A) in which a portion of Co in $CoSn_2$ is replaced by Fe, and alloy material B is based on $Co_3Sn_2$. A negative electrode material formed from $CoSn_2$ and a negative electrode material formed from $Co_3Sn_2$ were separately prepared, and the charge and discharge properties of these negative electrode materials were first investigated. Below, the manufacture of these negative electrode materials and the method used to evaluate charge and discharge properties will be described.

(Manufacture of $CoSn_2$)

Alloy raw materials prepared by blending Co and Sn at a mass ratio Co:Sn=19.9:80.1 were placed into an alumina melting crucible and heated by high-frequency induction heating to 1400° C. in an argon atmosphere to completely melt it. The melt was subjected to rapid solidification by the strip casting method using a water-cooled copper roll rotating at a circumferential speed of 70 m/min to obtain a cast in the form of thin strip. The cooling rate at this time between the liquidus temperature and the solidus temperature was approximately 5000° C./sec. The cast strip was pulverized using a pin mill to obtain a powder of an intermetallic compound made from $CoSn_2$ before MG treatment. The pulverizing time was set so that nearly the entire amount of the cast strip after pulverizing could pass through a sieve having openings measuring 106 μm.

(Manufacture of $Co_3Sn_2$)

Alloy raw materials prepared by blending Co and Sn at a mass ratio of Co:Sn=42.7:57.3 were processed in the same manner as for the manufacture of $CoSn_2$ to obtain a powder of an intermetallic compound made from $Co_3Sn_2$ before MG treatment.

(MG Treatment)

The intermetallic compound powder of $CoSn_2$ before MG treatment which was obtained as described above is subjected to MG treatment in a nitrogen atmosphere using a planet ball mill (Super Misuni) manufactured by Nisshin Giken Corp. to obtain a negative electrode material made from $CoSn_2$. At this time, the mass ratio of $CoSn_2$ to the balls was 10:100, and balls having a diameter of 6.25 mm were used. The MG time was made 0, 4, 24, 48, or 96 hours. The same MG treatment was carried out on the intermetallic compound powder of $Co_3Sn_2$ before MG treatment to obtain a negative electrode material made from $Co_3Sn_2$.

(Fabrication of a Battery and Evaluation of Charge and Discharge Properties)

In order to evaluate the charge and discharge properties of a battery using the negative electrode material of $CoSn_2$ or of $Co_3Sn_2$ obtained in the above-described manner, a battery for evaluation was fabricated, and its charge and discharge properties were evaluated. In the following description of the fabrication of the battery and evaluation of its charge and discharge properties, unless otherwise indicated, a negative electrode material of $CoSn_2$ will be referred to simply as $CoSn_2$, and a negative electrode material of $Co_3Sn_2$ will be referred to simply as $Co_3Sn_2$. The procedure for evaluating $CoSn_2$ will be explained. The procedure for evaluating $Co_3Sn_2$ was the same as for $CoSn_2$.

First, to the resulting $CoSn_2$ were added acetylene black (AB) as a conductive material, styrene butadiene rubber (SBR) as a binder, and carboxymethylcellulose (CMC) as a thickener. The mass ratio of these materials was $CoSn_2$:acetylene black:styrene butadiene rubber:carboxymethylcellulose=75:15:5:5. These materials were kneaded to obtain an electrode forming material. The electrode forming material was applied atop a copper foil which served as a current collector and dried to obtain an electrode. The mass of the dried electrode forming material on top of the electrode was determined, and the mass of $CoSn_2$ was calculated based on the mass ratio of $CoSn_2$ in the electrode forming material and made the mass of the negative electrode material contained in the battery. The mass of the negative electrode material can be considered to be the mass of the negative electrode active material.

Next, the above-described electrode which served as a working electrode and a metallic lithium foil which served as a counter electrode were placed inside a coin-shaped battery case. A porous polyethylene insulating layer was disposed between the above-described electrode and the metallic lithium foil, and an electrolytic solution was poured into the case. This electrolytic solution contained lithium hexafluorophosphate ($LiPF_6$) as an electrolyte, ethylene carbonate (EC), dimethylcarbonate (DMC), and ethyl methyl carbonate (EMC) as solvents, and vinylene carbonate (VC) and fluoroethylene carbonate (FEC) as additives. The concentration of $LiPF_6$ salt in the electrolytic solution was 1M. The volume ratio of the solvents and additives in the electrolytic solution was ethylene carbonate (EC):dimethylcarbonate (DMC):ethyl methyl carbonate (EMC):vinylene carbonate (VC):fluoroethylene carbonate (FEC)=1:2:0.1:0.05:0.2. The battery case was then sealed to obtain a battery.

The resulting battery was subjected to a charge and discharge test to evaluate the discharge capacity, the initial efficiency, and the cycle retention ratio. In this test, occlusion of Li ions by the above-described electrode which served as a working electrode was considered charging, and release of Li ions from that electrode was considered discharge. Charge was carried out by constant current charging until a predetermined inter-electrode voltage was reached followed by constant voltage charging until a predetermined current density was reached. Discharge was carried out by constant current discharge until a prescribed inter-electrode voltage was reached. Charge and discharge were repeated to evaluate the discharge capacity and the cycle retention ratio.

The charge and discharge test was carried out at an ambient temperature of 20° C. At the time of charge, constant current charging was carried out at a current density of 1 mA/cm² until an inter-electrode voltage of 5 mV was reached, and after the inter-electrode voltage reached 5 mV, constant voltage charging was carried out until the current density reached 0.01 mA/cm². At the time of discharge, constant current discharge was carried out at a current density of 1 mA/cm² until the inter-electrode voltage reached 1.5 mV. The integral of the current per 1 gram of mass of the negative electrode active material contained in the battery (mA/g) with respect to the discharge time (h) was made the discharge capacity (mAh/g). The integral of the current per 1 gram of mass of the negative electrode active material contained in the battery (mA/g) with respect to the charging time (h) was made the charge capacity (mAh/g). The value of (discharge capacity on first cycle)/(charge capacity on first cycle)×100 was made the initial efficiency (%). This charge and discharge test was repeated for 50 cycles, and the value of (discharge capacity on fiftieth cycle)/(discharge capacity on first cycle)×100 was made the cycle retention ratio (%).

Table 1 shows the result of evaluation of the charge and discharge properties of $CoSn_2$ and $Co_3Sn_2$. In Table 1, the discharge capacity, the initial efficiency, and the cycle retention ratio for $CoSn_2$ and $Co_3Sn_2$ can be compared for each MG time. For $CoSn_2$, the discharge capacity exhibited the largest value (665.4 mAh/g) and the initial efficiency exhibited the largest value (86.0%) when the MG time was 4 hours, and the cycle retention ratio for $CoSn_2$ had the largest value (90.4%) when the MG time was 48 hours. For $Co_3Sn_2$, the discharge capacity had the largest value (399.1 mAh/g) and the initial efficiency had the largest value (85.2%) when the MG time was 24 hours, and the cycle retention ratio had the largest value (109.2%) when the MG time was 0 hours. However, for $Co_3Sn_2$, the dependence of the cycle retention ratio on the MG time was low, and good values were obtained at each MG time.

TABLE 1

| | Co—57.3Sn $Co_3Sn_2$ | | | Co—80.2Sn $CoSn_2$ | | |
|---|---|---|---|---|---|---|
| MG time (hr) | Discharge capacity [mAh/g] | Initial efficiency [%] | Cycle retention ratio [%] | Discharge capacity [mAh/g] | Initial efficiency [%] | Cycle retention ratio [%] |
| 0 | 171.6 | 62.1 | 109.2 | 587.9 | 80.0 | 41.6 |
| 4 | 273.8 | 77.5 | 97.3 | 665.4 | 86.0 | 72.3 |
| 24 | 399.1 | 85.2 | 99.6 | 627.2 | 82.4 | 85.6 |
| 48 | 389.7 | 83.2 | 98.7 | 593.4 | 79.5 | 90.4 |
| 96 | 362.0 | 79.9 | 98.4 | 538.7 | 76.8 | 87.5 |

A comparison of $CoSn_2$ and $Co_3Sn_2$ shows that $CoSn_2$ had better results with respect to discharge capacity and initial efficiency, while $Co_3Sn_2$ had better results with respect to cycle retention ratio.

Figure 1:
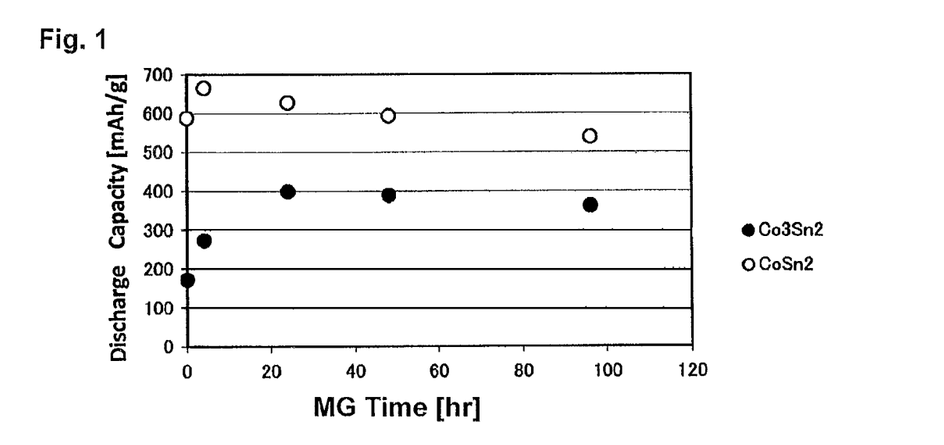
FIG. 1 is a diagram explaining the relationship between the MG time and the discharge capacity of a negative electrode material according to an embodiment of the present invention.

FIG. 1 is a diagram explaining the relationship between the MG time and discharge capacity for $CoSn_2$ and $Co_3Sn_2$. The ordinate in FIG. 1 is the discharge capacity (mAh/g), and the abscissa is the MG time (hours). $CoSn_2$ had a larger discharge capacity than $Co_3Sn_2$ when the MG time was 0 hours. The discharge capacity for $CoSn_2$ was a maximum value when the MG time was 4 hours, and then it gradually decreased as the MG time increased. $Co_3Sn_2$ had a low discharge capacity when the MG time was 0 hours, but when the MG time was 24 hours, the discharge capacity was at least twice that when the MG time was 0 hours and reached a maximum value. The maximum values of the discharge capacity were 665.4 mAh/g for $CoSn_2$ and 399.1 mAh/g for $Co_3Sn_2$. As the theoretical capacity of graphite is 372 mAh/g, it was confirmed that both $CoSn_2$ and $Co_3Sn_2$ have a higher capacity than graphite. It was found that depending upon the composition of a Co—Sn compound, a difference is observed in the relationship between the MG time and the discharge capacity. In order to investigate this relationship, X-ray diffraction measurement was then carried out.

Figure 2:
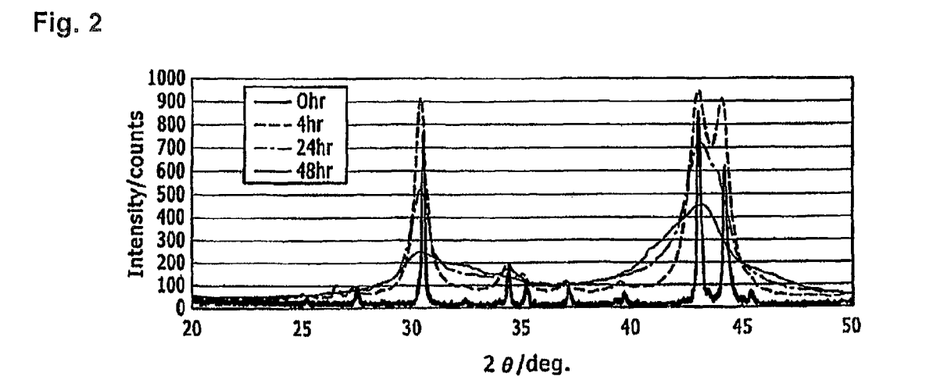
FIG. 2 is a diagram explaining the results of measurement of X-ray diffraction of $Co_3Sn_2$ at different MG times in an embodiment of the present invention.

FIG. 2 is a graph showing the results of the measurement of X-ray diffraction for $Co_3Sn_2$ at each MG time. The abscissa in FIG. 2 shows 2θ (unit: ° <degrees>) (θ is the Bragg reflection angle), and the ordinate shows the intensity of the diffraction line (unit: counts). Measurement of X-ray diffraction was carried out using an X-ray diffraction apparatus manufactured by Rigaku Corporation (RINT 1000). Cu was used as a target.

It was ascertained by the result of the measurement that as the MG time increases, broadening of the peak progresses indicating that nanocrystallization progresses. Comparing these results with the results of the above-described discharge capacity measurement (Table 1), it was found that capacity increases as nanocrystallization progresses. The mechanism for this phenomenon can be understood as follows.

Figure 3:
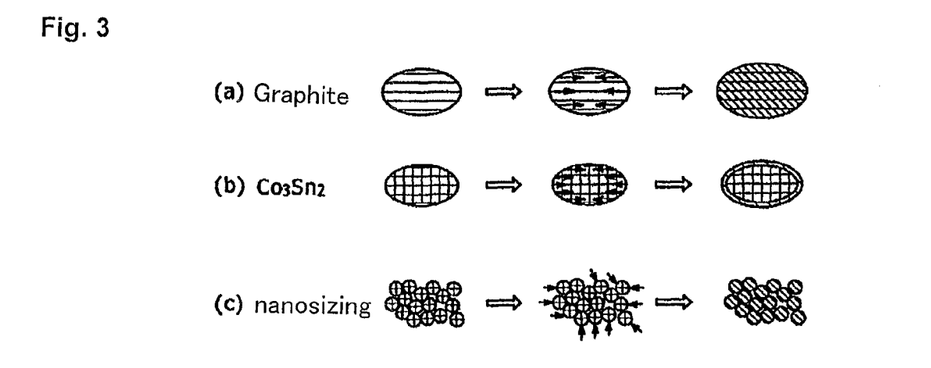
FIG. 3 is a schematic diagram explaining the state of Li diffusion in an embodiment of the present invention.

FIG. 3 is a schematic diagram explaining the state in which Li diffuses inside crystals. The state of diffusion of Li is shown by solid arrows. FIG. 3(a) is a diagram for explaining the case of graphite, for example. With graphite, diffusion of Li between layers within crystals proceeds smoothly. FIG. 3(b) is a diagram for explaining the case in which MG treatment of Co₃Sn₂ has not been carried out. When MG treatment is not carried out, the crystal grains are large and the reactive surface area is small. When using this material in a negative electrode material for a battery, the diffusion of Li in $Co_3Sn_2$ is slow, so Li does not move to the inside of crystals during charging. As a result, a large overvoltage is applied when charging is completed. FIG. 3(c) is a diagram explaining the case in which MG treatment of $Co_3Sn_2$ has been carried out. As a result of nanocrystallization, the crystal grains become small and the reactive surface area becomes large. It is thought that nanocrystallized particles have an extremely large number of diffusion paths for Li allowing diffusion of Li to take place smoothly and leading to an increased capacity.

Mechanical alloying (MA) in which a solid phase reaction starts from elementary metals is essentially a process in which Sn and Co which are introduced gradually react with each other as the MA time increases. If the treatment time is lengthened to inifinity, the same result is achieved as when MG treatment is carried out. However, if a reaction is considered to take place for a finite time, the crystal state is different from when MG treatment is performed.

In light of the above, it can be seen that $Co_3Sn_2$ is different from $CoSn_2$ in that its discharge capacity increases as the MG time increases. It also has good cycle properties. If $Co_3Sn_2$ which has undergone MG treatment is used in a negative electrode material, it is expected that a material having extremely good cycle properties can be obtained.

$CoSn_2$ has a higher capacity than $Co_3Sn_2$. However, $CoSn_2$ undergoes repeated expansion and contraction due to charge and discharge and becomes a fine powder, leading to worsening of the cycle properties of a battery. In contrast, $Co_3Sn_2$ has a lower capacity than $CoSn_2$, but it has good cycle properties. If $Co_3Sn_2$, which is a low capacity phase, is present along with $CoSn_2$, which is a high capacity phase, in a negative electrode material, stresses caused by volume fluctuation of the high capacity phase due to charge and discharge are alleviated, and powderization of the negative electrode material is suppressed. In addition, the negative electrode material has good cycle properties. Namely, by combining $CoSn_2$, which has a high capacity, and $Co_3Sn_2$, which has good cycle properties, in suitable amounts and applying the combination to a negative electrode material, a negative electrode material having a high capacity and improved cycle properties can be obtained.

In a commercial product, a desire for decreases in material costs makes it undesirable to use large amounts of Co. Therefore, a negative electrode material in which a portion of the Co in $CoSn_2$ was replaced by Fe was investigated.

(Investigation of the Amount of Replacement by Fe in $CoSn_2$)

A negative electrode material in which a portion of the Co in $CoSn_2$ was replaced by Fe was manufactured in the following manner. Four alloy materials which were all blended so that the mass ratio of Co to Sn was Co:Sn=19.9:80.1 and in which a portion of the Co was replaced by Fe were prepared. A product with 25% replacement by Fe was blended so that the mass ratio Co:Fe:Sn was 14.9:5.0:80.1. A product having 50% replacement by Fe was blended so that the mass ratio Co:Fe:Sn was 9.9:10.0:80.1. A product having 75% replacement by Fe was blended so that the mass ratio Co:Fe:Sn was 4.9:15.0:80.1. A product in the form of $FeSn_2$ having 100% replacement by Fe was blended so that the mass ratio Fe:Sn was 20.2:79.8. Other than the mixing ratio of the alloy raw materials, the manufacturing process was the same as for $CoSn_2$. However, MG treatment was not carried out. The charge and discharge properties of the resulting materials were evaluated in the same manner as described above.

Table 2 shows the proportion of Fe replacement in $CoSn_2$ and the results of evaluation of charge and discharge properties. The discharge capacity increased as the proportion of replacement by Fe increased. No significant tendency was observed with respect to the initial efficiency. It was confirmed that the cycle retention ratio significantly decreased as the proportion of replacement by Fe increased. From this fact, it was found that cycle properties significantly worsen as the proportion of replacement by Fe increases. Next, in order to investigate the cause of the worsening in properties, X-ray diffraction measurement was carried out.

TABLE 2

| Proportion of replacement by Fe [%] | Discharge capacity [mAh/g] | Initial efficiency [%] | Cycle retention ratio [%] |
|---|---|---|---|
| 25 | 623.5 | 78.9 | 87.6 |
| 50 | 641.8 | 77.3 | 84.3 |
| 75 | 662.3 | 78.1 | 78.1 |
| 100 | 676.7 | 77.3 | 72.3 |

Figure 4:
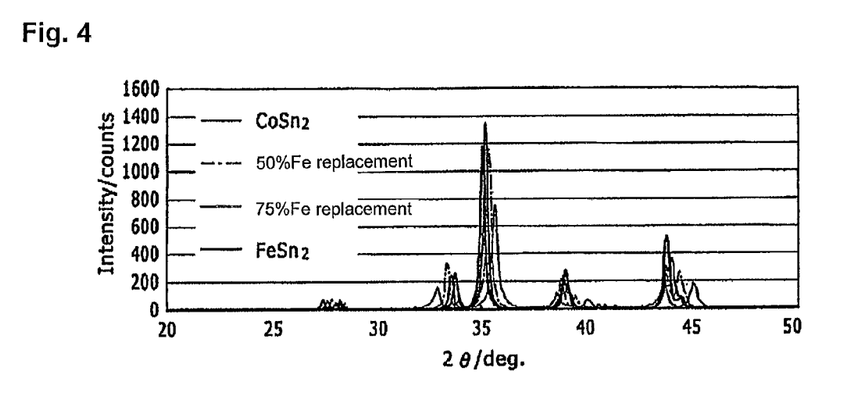
FIG. 4 is a diagram explaining the results of measurement of X-ray diffraction before MG treatment of $CoSn_2$ which underwent Fe replacement in an embodiment of the present invention.

FIG. 4 is a diagram which explains the results of X-ray diffraction measurement of materials in which Fe replacement was carried out on $CoSn_2$. The ordinate and the abscissa in FIG. 4 are the same as in FIG. 2. Measurement of X-ray diffraction was carried out in the same manner as when measuring X-ray diffraction at each MG time for $Co_3Sn_2$ (FIG. 2). The materials on which measurement were carried out were $CoSn_2$, a 50% Fe replacement product, a 75% Fe replacement product, and $FeSn_2$, which is a 100% Fe replacement product.

As a result of this measurement, it was found that as the proportion of replacement by Fe increases, the crystal lattice expands in the a-axis direction and contracts in the c-axis direction. The crystal structure of $FeSn_2$ was tetragonal, and the lattice constants were a=65.39 nm and b=53.25 nm. The crystal structure of $CoSn_2$ was tetragonal, and the lattice constants were a=63.61 nm and b=54.52 nm. From these facts, it was found that the lattice constants of $FeSn_2$ and $CoSn_2$ correlate well, and replacement progresses without the formation of other phases.

X-ray diffraction measurement was again carried out on the above-described materials based on $CoSn_2$ with Fe replacement after they had been subjected to MG treatment. X-ray diffraction measurement was carried out in the same manner as when measuring X-ray diffraction at each MG time for $Co_3Sn_2$. MG treatment was carried out in the same manner as described above. The MG time was made 48 hours, at which the cycle properties of $CoSn_2$ were the best.

Figure 5:
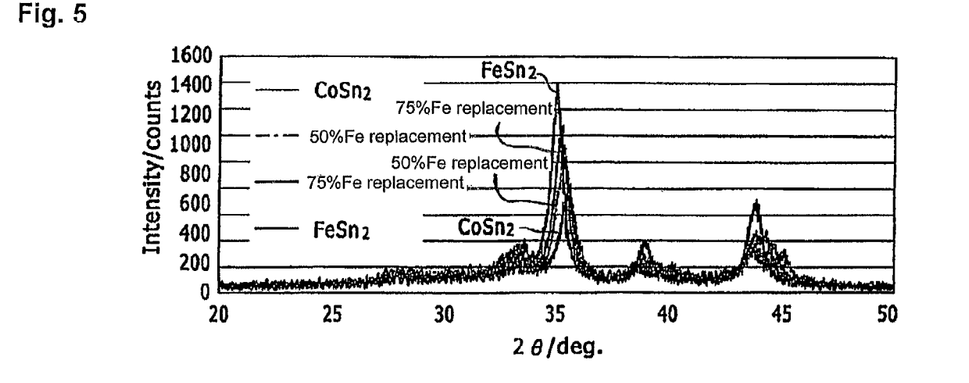
FIG. 5 is a diagram explaining the results of measurement of X-ray diffraction after MG treatment of $CoSn_2$ which underwent Fe replacement in an embodiment of the present invention.

FIG. 5 is a diagram explaining the results of measurement of X-ray diffraction for materials based on $CoSn_2$ with Fe replacement which were subjected to MG treatment. The ordinate and abscissa in FIG. 5 are the same as in FIG. 2. The variation in the half width of the peak which appeared in the range of 2θ=34°-37° before and after MG treatment was 0.315° to 0.762° in the case of $CoSn_2$, it was 0.259° to 0.702° in the case of the 50% Fe replacement product, it was 0.247° to 0.650° in the case of the 75% Fe replacement product, and it was 0.258° to 0.607° in the case of $FeSn_2$. Based on these facts, it is thought that it becomes more difficult for nanocrystallization to progress and that cycle properties worsen as the proportion of replacement by Fe increases. When the proportion of replacement by Fe exceeded 50 mass %, the cycle retention ratio fell below 80%. Therefore, in the following experiments, the limit on the proportion of Fe replacement was made 50 mass %.

Thus, it was found that the proportion of replacement by Fe when replacing a portion of Co in $CoSn_2$ with Fe should be at most 50 mass %. In the following experiments, a material in which at most 50 mass % of Co in $CoSn_2$ was replaced by Fe was designated alloy material A. $Co_3Sn_2$ was designated alloy material B. An conductive material which was graphite was mixed with a mixture of alloy material A and alloy material B. Namely, experiments were carried out on a negative electrode material formed by mixing alloy material A, alloy material B, and graphite.

Investigations were carried out with the object of optimizing the composition of alloy material A, the mixing ratio of alloy material A and alloy material B, the graphite content, and the MG time. In carrying out investigations with the purpose of optimization, a negative electrode material which served as a reference for studying optimization (referred to below as reference negative electrode material) was prepared. For this reference negative electrode material, the proportion of Sn in alloy material A was 79.8 mass %, and the proportion $R_B$ of alloy material B based on the total mass of alloy material A and alloy material B was 20.0 mass %. The amount of graphite was such that the proportion $R_C$ of the mass of graphite based on the total mass of alloy material A, alloy material B, and graphite (in other words, the content of graphite based on the total content of alloy material A, alloy material B, and graphite as a conductive material) was 15.0 mass %. The MG time was 24 hours. A reference negative electrode material which was obtained in this manner is identified as Example 1 in below-described Table 3.

First, the manufacture of the reference negative electrode material will be described. The reference negative electrode material was obtained by combining alloy material A, alloy material B, and graphite and subjecting the resulting mixture to MG treatment. Alloy material A and alloy material B were separately prepared by the two-alloy method. Here, the two-alloy method means a method in which the alloy raw materials are divided into two parts, and the alloy raw material in each part is separately melted and cast. In contrast, a method in which all of the alloy raw materials are melted at the same time and cast is referred to as the usual casting method.

(Manufacture of Alloy Raw Material A)

An alloy raw material obtained by blending Co, Fe, and Sn in the mass ratio Co:Fe:Sn=10.1:10.1:79.8 was placed into an alumina melting crucible and was completely melted by high frequency induction heating to 1400° C. in an argon atmosphere. The melt was then rapidly solidified by the strip casting method using a water-cooled copper roll rotating at a circumferential speed of 70 m/min to obtain thin cast strips. The cooling rate between the liquidus temperature and the solidus temperature at this time was approximately 5000° C./sec. The cast strips were pulverized using a pin mill to obtain alloy material A in which 50 mass % of Co in $CoSn_2$ was replaced by Fe.

(Manufacture of Alloy Material B)

Alloy material B was manufactured in the same manner as for alloy material A except that Co and Sn were blended in the mass ratio Co:Sn=42.7:57.3 so as to form $Co_3Sn_2$.

(Mixing of Raw Materials)

The resulting alloy material A, alloy material B, and graphite were mixed so that the mass ratio of alloy material A:alloy material B:graphite=68.0:17.0:15.0 to obtain a mixture. At this time, $R_B$ was 20.0 mass % and $R_C$ was 15.0 mass %. The average particle diameter was around 45 μm for alloy material A, around 38 μm for alloy material B, and around 25 μm for the graphite.

(MG Treatment)

Using a planet ball mill (Super Misuni) manufactured by Nisshin Giken Corp., the above-described mixture was subjected to MG treatment in a nitrogen atmosphere. At this time, the mass ratio of the mixture to the balls was 10:100, and balls having a diameter of 6.25 mm were used. The MG time was 24 hours. The material which underwent MG treatment was made a reference negative electrode material.

Figure 6:
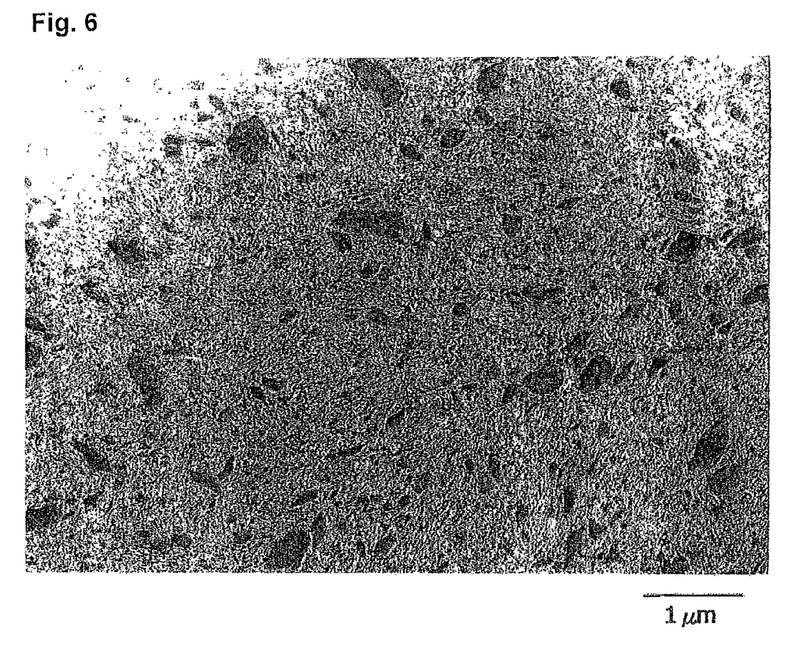
FIG. 6 is a diagram explaining the results of TEM observation of a reference negative electrode material according to an embodiment of the present invention.
Figure 7:
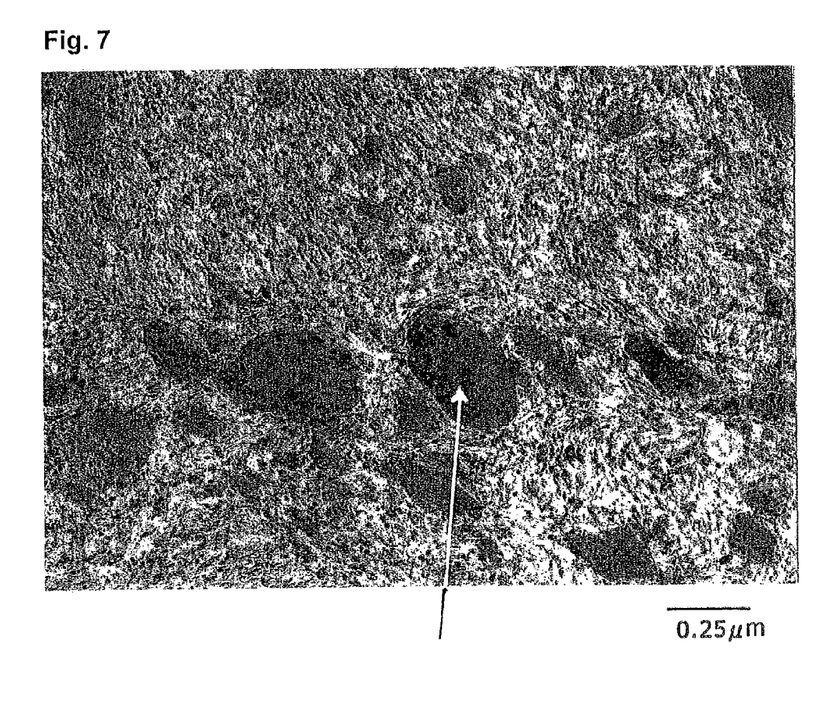
FIG. 7 is an explanatory diagram showing enlarged results of TEM observation of a reference negative electrode material according to an embodiment of the present invention.
Figure 8:
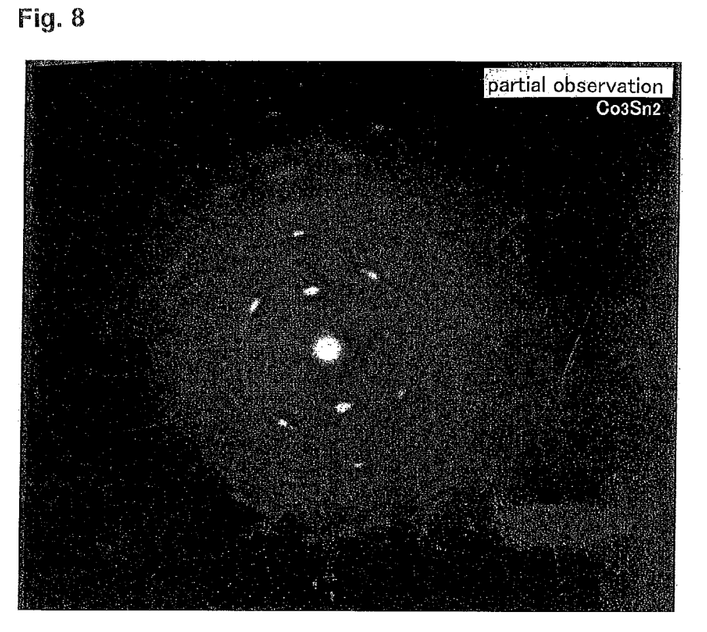
FIG. 8 is a diagram showing an electron diffraction image of nanocrystals of a reference negative electrode material according to an embodiment of the present invention.

FIG. 6 is a diagram which explains the results of observation of the resulting reference negative electrode material with a transmission electron microscope (TEM). Measurement was carried out using a model JEM-3010 transmission electron microscope manufactured by JEOL Ltd. As pretreatment of a measurement sample, the reference negative electrode material was subjected to platinum coating followed by surface treatment which was performed by sputtering with a focused ion beam (FIB) device. The surface treatment was carried out using a model FB-2000A focused ion beam processing and observation device manufactured by Hitachi, Ltd. As shown in FIG. 6, it was ascertained that the reference negative electrode material had a structure in which nanocrystals having a size of at most 1 μm, which appear as black portions, were interspersed in a material forming a matrix (referred to below as the base material). FIG. 7 shows the result when a portion of FIG. 6 in which nanocrystals were seen was enlarged and observed. As a result of observation of the nanocrystal shown by an arrow in FIG. 7, the electron beam diffraction image of $Co_3Sn_2$ shown in FIG. 8 was obtained.

Figure 9:
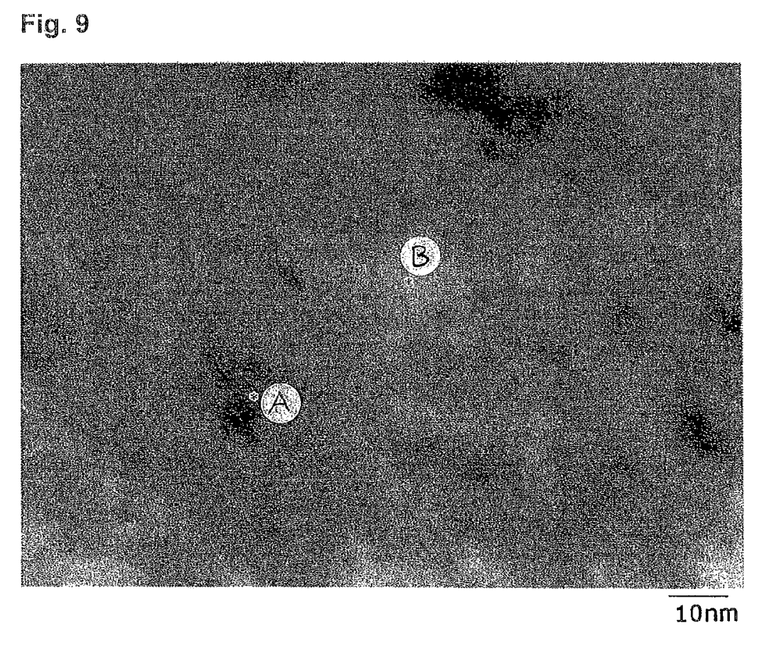
FIG. 9 is a diagram explaining locations which underwent qualitative analysis of the base material of a reference negative electrode material according to an embodiment of the present invention.
Figure 10:
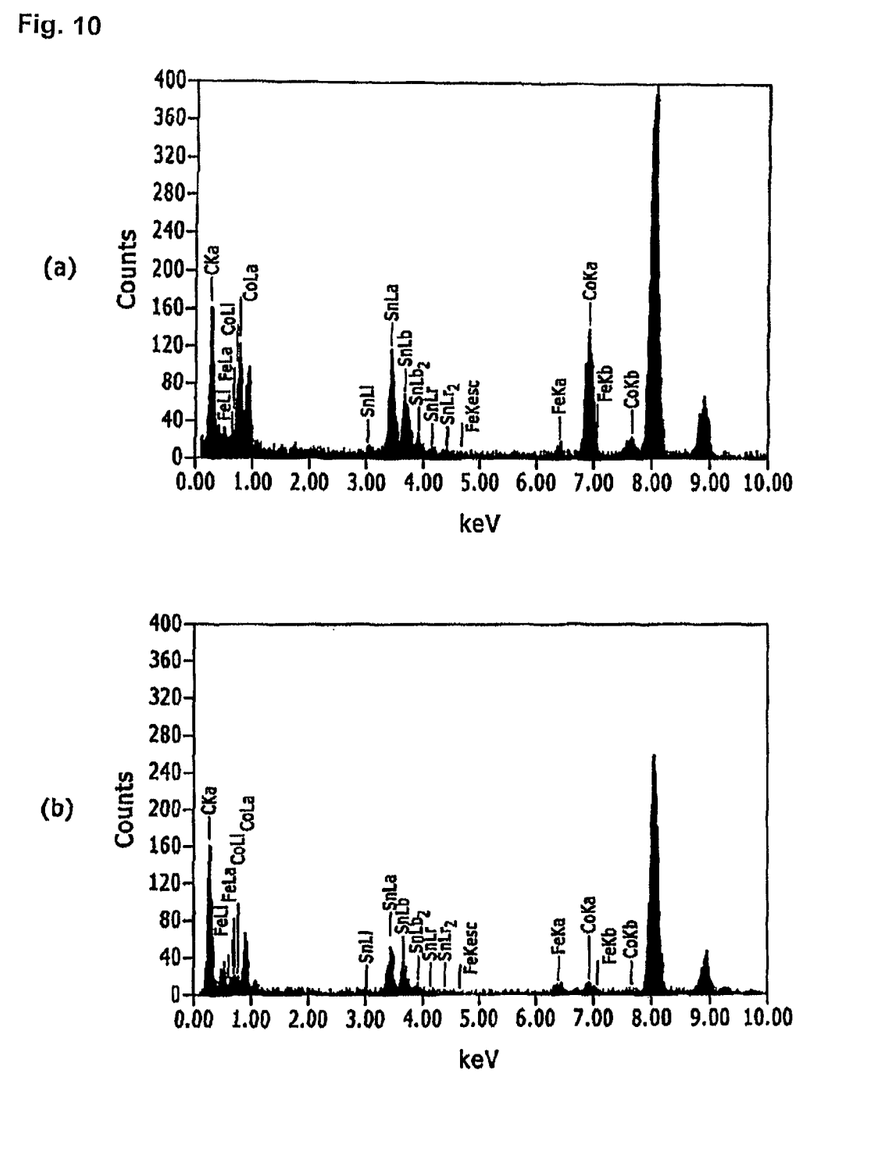
FIG. 10 is a diagram explaining the results of qualitative analysis of the base material of a reference negative electrode material according to an embodiment of the present invention, wherein (a) shows the results of analysis of portion A in FIG. 9 and (b) shows the results of analysis of portion B in FIG. 9.

FIG. 9 is an enlarged view showing the state of the base material. The two points having a different contrast in the base material (portion A and portion B) were measurement locations which underwent qualitative analysis. FIGS. 10(a) and 10(b) are diagrams explaining the results of analysis. FIG. 10(a) shows the results of analysis of portion A in FIG. 9, and FIG. 10(b) shows the results of analysis of portion B in FIG. 9. Peaks for Co, Fe, Sn and C were obtained from both portions A and B. In portion A, marked peaks of Co and Sn were observed, and it was thought that substances based on alloy material A or alloy material B were the main components therein. In portion B, the peak for C was more marked than for Co or Sn, and it is thought that the main components therein were graphite-based substances. From these results, it was confirmed that alloy material A, alloy material B, and graphite were mixed together in the negative electrode material.

Next, using the material according to Example 1 as a reference, investigations were carried out with the object of optimizing the composition of alloy material A, the mixing ratio of alloy material A and alloy material B, the graphite content, and the MG time. The results of this investigation are set forth in Table 3 as examples and comparative examples. Table 3 explains the results of evaluation of the raw material composition of the examples and comparative examples. In Table 3, Part (a) shows the results of investigation of the composition of alloy material A (indicated as alloy A in the table). Part (b) shows the results of investigation of the mixing ratio of alloy material A and alloy material B (indicated as alloy B in the table). Part (c) shows the results of investigation of the graphite content. Part (d) shows the results of investigation of the MG time and the exotherm starting temperature.

TABLE 3

| | Composition of Alloy A | Composition of Alloy B | Alloy B/(Alloy A + Alloy B) | Alloy A:Alloy B:Graphite | MG Time [hr] | Exotherm starting temp. [° C.] |
|---|---|---|---|---|---|---|
| (a) | 9.0Co—9.0Fe—82.0Sn | Co—57.3Sn | 20.0 | 68:17:15 | 24 | 199.5 |
| Variation in | 9.1Co—9.1Fe—81.8Sn | Co—57.3Sn | 20.0 | 68:17:15 | 24 | 204.2 |
| composition | 9.9Co—10.0Fe—80.1Sn | Co—57.3Sn | 20.0 | 68:17:15 | 24 | 215.6 |
| of Alloy A | 10.1Co—10.1Fe—79.8Sn | Co—57.3Sn | 20.0 | 68:17:15 | 24 | 227.8 |
| | 15.0Co—14.9Fe—70.1Sn | Co—57.3Sn | 20.0 | 68:17:15 | 24 | 257.4 |
| | 16.9Co—17.0Fe—66.1Sn | Co—57.3Sn | 20.0 | 68:17:15 | 24 | 382.1 |
| (b) | 10.1Co—10.1Fe—79.8Sn | Co—57.3Sn | 5.9 | 80:5:15 | 24 | 204.2 |
| Variation in | 10.1Co—10.1Fe—79.8Sn | Co—57.3Sn | 7.1 | 79:6:15 | 24 | 210.3 |
| mixing ratio | 10.1Co—10.1Fe—79.8Sn | Co—57.3Sn | 20.0 | 68:17:15 | 24 | 227.8 |
| of Alloy A | 10.1Co—10.1Fe—79.8Sn | Co—57.3Sn | 23.5 | 65:20:15 | 24 | 256.3 |
| and Alloy B | 10.1Co—10.1Fe—79.8Sn | Co—57.3Sn | 25.9 | 63:22:15 | 24 | 276.1 |
| | 10.1Co—10.1Fe—79.8Sn | Co—57.3Sn | 27.1 | 62:23:15 | 24 | 304.6 |
| (c) | 10.1Co—10.1Fe—79.8Sn | Co—57.3Sn | 20 | 64:16:20 | 24 | 235.1 |
| Variation in | 10.1Co—10.1Fe—79.8Sn | Co—57.3Sn | 20 | 68:17:15 | 24 | 227.8 |
| graphite | 10.1Co—10.1Fe—79.8Sn | Co—57.3Sn | 20 | 72:18:10 | 24 | 215.6 |
| content | 10.1Co—10.1Fe—79.8Sn | Co—57.3Sn | 20 | 74:19:7 | 24 | 228.9 |
| | 10.1Co—10.1Fe—79.8Sn | Co—57.3Sn | 20 | 76:19:5 | 24 | 218.6 |
| (d) | 10.1Co—10.1Fe—79.8Sn | Co—57.3Sn | 20 | 68:17:15 | 5 | 375.4 |
| Variation in | 10.1Co—10.1Fe—79.8Sn | Co—57.3Sn | 20 | 68:17:15 | 10 | 331.4 |
| MG time | 10.1Co—10.1Fe—79.8Sn | Co—57.3Sn | 20 | 68:17:15 | 24 | 227.8 |

| | | Composition of Alloy A | Discharge Capacity [mAh/g] | Initial Efficiency [%] | Cycle retention ratio [%] | Remarks |
|---|---|---|---|---|---|---|
| | (a) | 9.0Co—9.0Fe—82.0Sn | 634.8 | 74.3 | 93.9 | Comp. Ex. a-1 |
| | Variation in | 9.1Co—9.1Fe—81.8Sn | 630.2 | 74.5 | 95.1 | Example a-2 |
| | composition | 9.9Co—10.0Fe—80.1Sn | 615.2 | 74.9 | 97.6 | Example a-3 |
| | of Alloy A | 10.1Co—10.1Fe—79.8Sn | 577.8 | 75.1 | 98.2 | Example 1 |
| | | 15.0Co—14.9Fe—70.1Sn | 542.0 | 75.0 | 98.6 | Example a-4 |
| | | 16.9Co—17.0Fe—66.1Sn | 510.2 | 75.2 | 99 | Comp. Ex. a-5 |
| | (b) | 10.1Co—10.1Fe—79.8Sn | 615.3 | 75.9 | 93.2 | Comp. Ex. b-1 |
| | Variation in | 10.1Co—10.1Fe—79.8Sn | 610.9 | 76.3 | 95.3 | Example b-2 |
| | mixing ratio | 10.1Co—10.1Fe—79.8Sn | 577.8 | 75.1 | 98.2 | Example 1 |
| | of Alloy A | 10.1Co—10.1Fe—79.8Sn | 536.1 | 76.1 | 99.2 | Example b-3 |
| | and Alloy B | 10.1Co—10.1Fe—79.8Sn | 520.4 | 75.7 | 99.3 | Example b-4 |
| | | 10.1Co—10.1Fe—79.8Sn | 498.0 | 75.8 | 99.5 | Comp. Ex. b-5 |
| | (c) | 10.1Co—10.1Fe—79.8Sn | 566.2 | 73.8 | 98.1 | Example c-1 |
| | Variation in | 10.1Co—10.1Fe—79.8Sn | 577.8 | 75.1 | 98.2 | Example 1 |
| | graphite | 10.1Co—10.1Fe—79.8Sn | 586.3 | 76.2 | 97.6 | Example c-2 |
| | content | 10.1Co—10.1Fe—79.8Sn | 587.1 | 76.9 | 95 | Example c-3 |
| | | 10.1Co—10.1Fe—79.8Sn | 589.3 | 77.1 | 89.4 | Comp. Ex. c-4 |
| | (d) | 10.1Co—10.1Fe—79.8Sn | 586.3 | 76.3 | 90.3 | Comp. Ex. d-1 |
| | Variation in | 10.1Co—10.1Fe—79.8Sn | 582.1 | 75.8 | 95.1 | Example d-2 |
| | MG time | 10.1Co—10.1Fe—79.8Sn | 577.8 | 75.1 | 98.2 | Example 1 |

As shown in Table 3, the discharge capacity, the initial efficiency, and the cycle retention ratio were evaluated as the charge and discharge properties of each negative electrode material. The charge and discharge properties were evaluated in the same manner as described above. In the evaluation of charge and discharge properties, a discharge capacity of at least 520.0 mAh/g and a cycle retention ratio of at least 95.0% were regarded as acceptable lines for optimization.

Part (a) in Table 3 shows comparative examples and examples in which the composition of alloy material A was varied. Except for varying the mass ratio when blending Co, Fe, and Sn, preparation of the negative electrode materials, fabrication of a battery, and evaluation of charge and discharge properties were carried out in the same manner as in Example 1. Comparative Example a-1 was blended so that the mass ratio Co:Fe:Sn was 9.0:9.0:82.0. Example a-2 was blended so that the mass ratio Co:Fe:Sn was 9.1:9.1:81.8. Example a-3 was blended so that the mass ratio Co:Fe:Sn was 9.9:10.0:80.1. Example 1 was blended so that the mass ratio Co:Fe:Sn was 10.1:10.1:79.8. Example a-4 was blended so that the mass ratio Co:Fe:Sn was 15.0:14.9:70.1. Comparative Example a-5 was blended so that the mass ratio Co:Fe:Sn was 16.9:17.0:66.1.

It can be seen that Comparative Example a-1, which had the largest proportion of Sn, had an extremely low exotherm starting temperature, and the cycle retention ratio fell below the acceptable line for optimization. On the other hand, Comparative Example a-5 had a low proportion of Sn, so the exotherm starting temperature become too high and the discharge capacity was lower than the acceptable line. From these facts, the proportion of the mass of Sn in the mass of alloy material A (namely, the Sn content of alloy material A, which is referred to below as $R_S$) is preferably at least 70.1 mass % and less than 82.0 mass %. More preferably, $R_S$ is at least 70.1 mass % and at most 80.1 mass %.

Part (b) in Table 3 shows comparative examples and examples in which the mixing ratio of alloy material A and alloy material B was varied. Other than varying the mixing ratio of alloy material A and alloy material B, preparation of a negative electrode material, fabrication of a battery, and evaluation of charge and discharge properties were carried out in the same manner as in Example 1. In Comparative Example b-1, $R_B$ (the proportion of the mass of alloy material B based on the total mass of alloy material A and alloy material B) was 5.9 mass %. In Example b-2, $R_B$ was 7.1 mass %. In Example 1, $R_B$ was 20.0 mass %. In Example b-3, $R_B$ was 23.5 mass %. In Example b-4, $R_B$ was 25.9 mass %. In Comparative Example b-5, $R_B$ was 27.1 mass %.

Comparative Example b-1, which had the lowest mixing ratio of alloy material B, had a cycle retention ratio which fell below the acceptable line for optimization. In Comparative Example b-5, for which the mixing ratio of alloy material B was largest, the discharge capacity fell below the optimal line. In the other examples, namely, Example b-2, Example 1, Example b-3, and Example b-4, the results were above the acceptable line for optimization. This shows that $R_B$ is preferably greater than 5.9 mass % and less than 27.1 mass %. More preferably, $R_B$ is at least 7.1 mass % and at most 23.5 mass %.

Part (c) in Table 3 shows comparative examples and examples in which the graphite content was varied. Other than varying the graphite content, the preparation of a negative electrode material, the fabrication of a battery, and the evaluation of charge and discharge properties were carried out in the same manner as in Example 1. $R_C$ (the proportion of the mass of graphite based on the total mass of alloy material A, alloy material B, and graphite) for Example c-1 was 20.0 mass %. $R_C$ for Example 1 was 15.0 mass %. $R_C$ for Example c-2 was 10.0 mass %. $R_C$ for Example c-3 was 7.0 mass %. $R_C$ for Comparative Example c-4 was 5.0 mass %.

In Comparative Example c-4 for which the mixing percentage of carbon was the smallest, the cycle retention ratio fell below the acceptable line for optimization. In the other examples, namely, Example c-1, Example 1, Example c-2, and Example c-3, the results were above the acceptable line for optimization. This shows that $R_C$ is preferably at least 7.0 mass % and at most 20.0 mass %. More preferably, $R_C$ is at least 10.0 mass % and at most 20.0 mass %.

Part (d) in Table 3 shows comparative examples and examples in which the MG time was varied. Other than varying the MG time, the preparation of a negative electrode material, the fabrication of a battery, and the evaluation of charge and discharge properties were the same as in Example 1. For Comparative Example d-1, the MG time was 5 hours. For Example d-2, the MG time was 10 hours. For Example 1, the MG time was 24 hours.

In Comparative Example d-1 for which the MG time was the shortest, the exotherm starting temperature was high and the cycle retention ratio fell below the acceptable line for optimization. In the other examples, namely, Example d-2 and Example 1, the results were above the acceptable line for optimization. This shows that the MG time preferably exceeds 5 hours. More preferably, the MG time is at least 10 hours and at most 24 hours.

Figure 11:
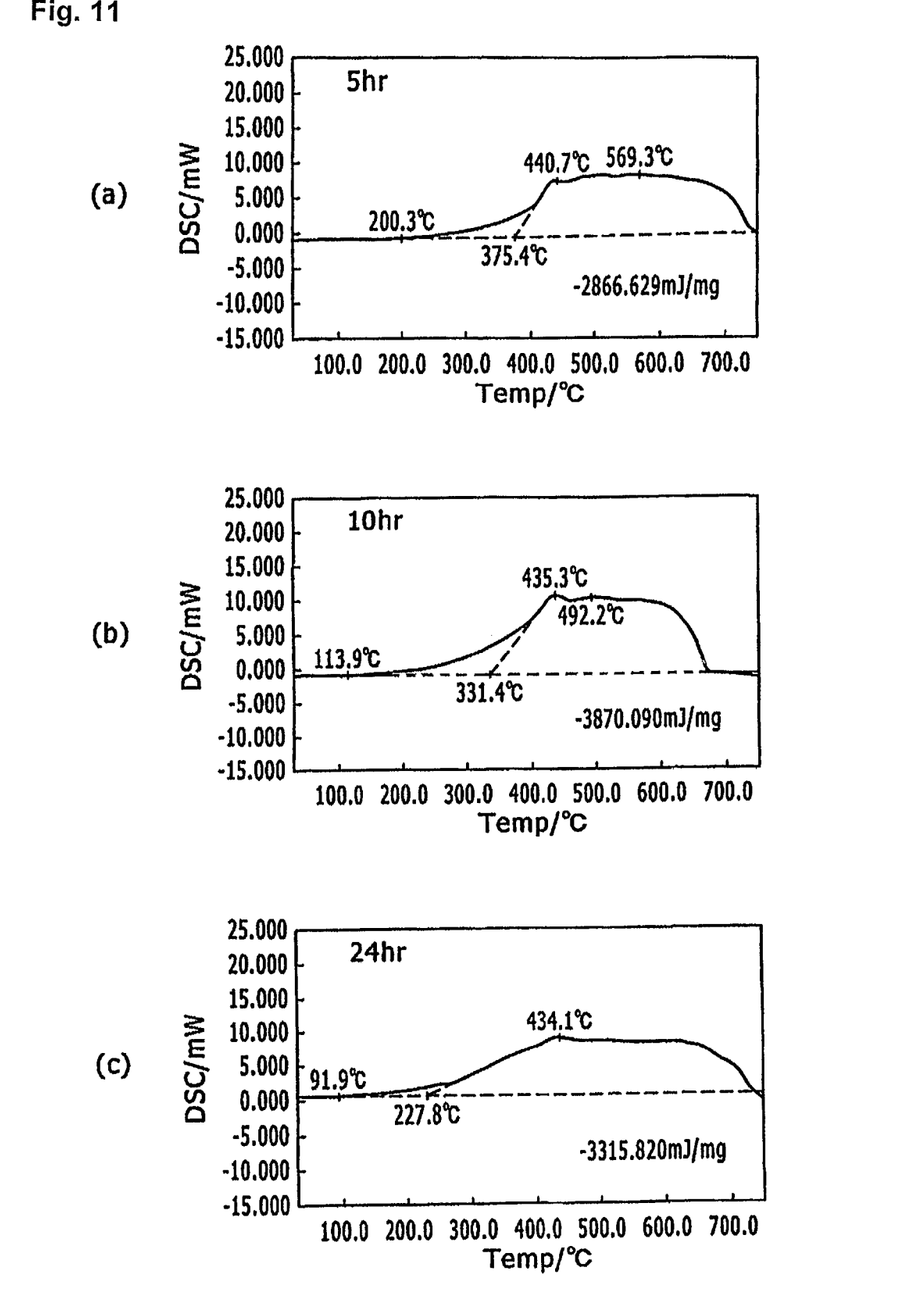
FIG. 11 is a diagram explaining the relationship between the MG time and the results of differential scanning calorimetry for a negative electrode material according to an embodiment of the present invention.

FIG. 11 is a diagram explaining the results of differential scanning calorimetry measurement carried out on Comparative Example d-1, Example d-2, and Example 1 in which the MG time was varied. FIG. 11(a) shows the results of measurement for Comparative Example d-1, FIG. 11(b) shows the results of measurement for Example d-2, and FIG. 11(c) shows the results of measurement for Example 1. In FIG. 11(a), FIG. 11(b), and FIG. 11(c), the ordinate indicates heat flow (mW) and the abscissa indicates temperature (° C.). A model DSC6200R differential scanning calorimeter made by SII NanoTechnology Inc. was used for the differential scanning calorimetry. The range of temperature increase was from 20° C. to 750° C. The rate of temperature increase was made 10° C./min. An exothermic peak during temperature increase indicates an exothermic reaction. The exothermic peak on the lowest temperature side underwent peak separation. The intersection between the tangent to the separated peak on the side for the start of exotherm (shown by a dashed line in the figure) and an elongation of the level portion which appears before exotherm occurs (also shown by a dashed line) indicates the exotherm starting temperature. The exotherm starting temperature was 375.4° C. for Comparative Example d-1, 331.4° C. for Example d-2, and 227.8° C. for Example 1. It was found that the exotherm starting temperature decreased as the MG time became longer. This exothermic reaction is thought to be because strains which have accumulated in crystals are released or because recrystallization takes place. A change in the exotherm starting temperature can be considered to be an index of the degree of progression of nanocrystallization. Therefore, the exotherm starting temperature in differential scanning calorimetry was made less than 375.4° C. More preferably, the exotherm starting temperature is at least 227.8° C., and at most 331.4° C.

INDUSTRIAL APPLICABILITY

A negative electrode material for a nonaqueous electrolyte secondary battery and a method for its manufacture according to the present invention can be applied to nonaqueous electrolyte secondary batteries such as lithium ion secondary batteries.

The invention claimed is:

1. A negative electrode material for a nonaqueous electrolyte secondary battery, characterized in that:
the negative electrode material comprises at least three types of powder materials,
the three types of powder materials are respectively alloy material A, alloy material B, and a conductive material,
said alloy material A comprises an alloy containing Co, Sn, and Fe and having a $CoSn_2$ structure and an Sn content which is at least 70.1 mass % and less than 82.0 mass %,
said alloy material B comprises $Co_3Sn_2$ and has a lower capacity than alloy material A,
a proportion $R_B$ of the mass of alloy material B based on the total mass of is alloy material A and alloy material B is greater than 5.9% and less than 27.1%,
the content of the conductive material with respect to the total of alloy material A, alloy material B, and the conductive material is at least 7 mass % and at most 20 mass %, and
the negative electrode material has an exotherm starting temperature of less than 375.4° C. as determined by differential scanning calorimetry.

2. A negative electrode material for a nonaqueous electrolyte secondary battery as set forth in claim 1 wherein the conductive material comprises graphite.

3. A method of manufacturing a negative electrode material for a nonaqueous electrolyte secondary battery characterized by comprising:
a first alloy material forming step including the formation of alloy material A which comprises an alloy containing Co, Sn, and Fe and having a $CoSn_2$ structure and an Sn content of at least 70.1 mass % and less than 82.0 mass %;
a second alloy material forming step including the formation of alloy material B which comprises $Co_3Sn_2$ and has a lower capacity than alloy material A; and
a mixing step comprising mixing alloy material A, alloy material B, and a conductive material so that a proportion $R_B$ of the mass of alloy material B based on the total mass of alloy material A and alloy material B is greater than 5.9% and less than 27.1%, and so that the content of the conductive material with respect to all components of the mixture is at least 7 mass % and at most 20 mass % to obtain a negative electrode material having an exotherm starting temperature of less than 375.4° C. as determined by differential scanning calorimetry.

4. A manufacturing method as set forth in claim 3 including first mechanical grinding treatment in which alloy material A is treated by mechanical grinding and second mechanical grinding treatment in which alloy material B is treated by mechanical grinding.

5. A manufacturing method as set forth in claim 4 wherein the mixing step includes third mechanical grinding treatment in which a mixture containing at least alloy material A and alloy material B is treated by mechanical grinding and wherein the third mechanical grinding treatment functions as the first mechanical grinding treatment and the second mechanical grinding treatment.

6. A manufacturing method as set forth in claim 4 wherein:
the conductive material comprises graphite, and
the mixing step includes fourth mechanical grinding treatment in which a mixture containing at least alloy material A, alloy material B, and the conductive material is treated by mechanical grinding, the fourth mechanical grinding treatment functioning as the first mechanical grinding treatment and the second mechanical grinding treatment.

\* \* \* \* \*